Sept. 23, 1969   R. SOLOMON ET AL   3,469,207
METAL-CERAMIC GAS LASER DISCHARGE TUBE
Filed June 24, 1965

INVENTORS
RAYMOND SOLOMON
LOUIS F. MUELLER JR.
BY *Wm. F. Nolan*
ATTORNEY

United States Patent Office
3,469,207
Patented Sept. 23, 1969

3,469,207
METAL-CERAMIC GAS LASER DISCHARGE TUBE
Raymond Solomon, Sunnyvale, Calif., and Louis F. Mueller, Jr., Marblehead, Mass., assignors to Varian Associates, Palo Alto, Calif., a corporation of California
Filed June 24, 1965, Ser. No. 467,825
Int. Cl. H01s 3/22
U.S. Cl. 331—94.5                     10 Claims

ABSTRACT OF THE DISCLOSURE

The envelope of the laser is formed of hollow cylindrical alternating metal and ceramic sections brazed together to form a vacuum-tight wall. The metal sections when energized with the operating potentials serve as the electrodes of the laser while the ceramic sections serve as insulators. This simple structure eliminates complex and fragile electrode supports and permits efficient cooling of the electrodes which form exposed exterior portions of the envelope.

---

This invention relates generally to optical masers, or lasers, and more particularly to gas discharge laser tubes.

Maser devices are now rather extensively used as amplifiers of electromagnetic wave energy. The amplification is achieved by stimulated emission from a negative temperature medium formed by a population inversion in a characteristic energy level system. Optical masers, or lasers as they are now known, typically employ reflective surfaces so positioned with respect to each other and with respect to the negative temperature medium that light waves pass through the active medium as they reciprocate between the reflective surfaces. While passing through the active laser medium the wave is amplified by interaction with the excited atoms or molecules therein. Operative laser devices generally include solid state lasers which utilize solid state crystals as active laser media and gaseous lasers which utilize suitable gases as active media. It is with respect to the gaseous laser that the present invention has primary utility.

The population or energy level inversion necessary for laser action is accomplished in gaseous lasers by subjecting a tube-confined active gaseous medium to an electric discharge. The gas discharge is excited in some devices by direct current energized electrodes positioned within the laser tube and in others by radio-frequency energized electrodes mounted outside the tube. The preferred applicability of the present invention is with the D.C. energized, internal electrode laser tube.

Prior gas discharge laser tubes while possessing many desirable features such as low power input and continuous operation, have also exhibited substantial disadvantages. These include relatively complex and fragile features of construction, use of inefficient gas discharges, short life, high tube operating temperatures, etc.

The object of this invention therefore is to provide an improved higher efficiency gas discharge laser tube with an increased life expectancy and lower cost than gas laser tubes presently available.

One feature of this invention is the provision of a gas discharge laser tube having an active gas filled envelope composed of alternate non-conductive and conductive sections which function as gas discharge initiating electrodes.

Another feature of this invention is the provision of a gas discharge laser tube of the above featured type wherein the envelope sections have a circular cross section and are connected in coaxial alignment thereby permitting the establishment of a highly efficient hollow cathode gas discharge within the laser envelope.

Another feature of this invention is the provision of a gas discharge laser tube of the above featured types wherein the ends of the laser envelope are sealed by optically transparent flat windows which lie at an angle $\phi$ with the central axis of the envelope and wherein $\phi$ is equal to 90° minus the Brewster angle $\theta$.

Another feature of this invention is the provision of a gas discharge laser tube of the above featured types including a beam focusing annular solenoid surrounding the laser hollow envelope.

Another feature of this invention is the provision of a gas discharge laser tube of the above featured types wherein the laser envelope comprises a central section composed of an electrical insulation material and straddling anode and cathode electrode sections adapted upon energization to produce a gas discharge within the laser envelope.

Another feature of this invention is the provision of a gas discharge laser tube of the next above featured types wherein the laser envelope comprises an elongated central cathode electrode section and straddling anode electrode sections connected to and insulated from the cathode electrode section by annular electrically insulating spacers.

Another feature of this invention is the provision of a gas discharge laser tube of the above featured type including auxiliary cathode electrode sections connected to and insulated from the anode electrode sections by auxiliary annular spacer sections.

These and other objects and features of the present invention will become apparent upon a perusal of the following specification taken in conjunction with the accompanying drawings wherein.

Figure 1:
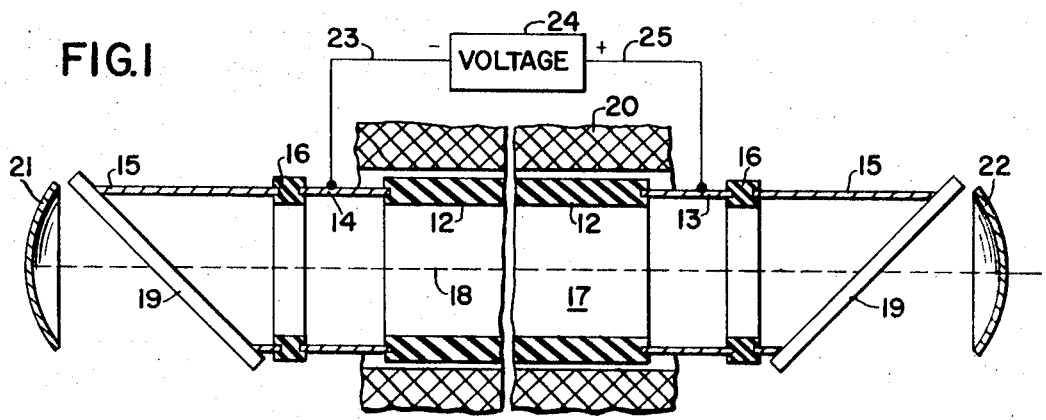
FIG. 1 is a cross-sectional view illustrating one preferred gas discharge laser tube embodiment of the invention with a portion of the uniform midsection eliminated.

Referring now to FIG. 1 there is shown an elongated cylindrical central section 12 composed of an electrical insulation material such as ceramic. Straddling the elongated central section 12 are an annular anode electrode section 13 and an annular cathode electrode section 14, both composed of an electrically conductive material. Hollow end sections 15, which may be of a metallic material are connected to and insulated from the anode section 13 and the cathode section 14 by annular spacer sections 16 also composed of an electrical insulation material such as ceramic. The individual envelope sections 12, 13, 14, 15 and 16 are of circular cross section and are connected vacuum tightly, for example by brazing, in coaxial alignment to form hollow elongated laser envelope 17 having a primary central axis 18. The ceramic and metal sections may be connected by means of thin Kovar cups for relieving stress between the sections; or by metallized bonding, by way of example. A solenoid 20 connected to a suitable source of power (not shown) surrounds the elongated hollow envelope 17 for magnetic confinement of the discharge energy.

The ends of hollow elongated envelope 17 are vacuum tightly sealed by elliptical or circular output windows 19 attached to the ends of the end sections 15. The output windows 19 are made of a high quality homogeneous optical glass, of which Corning No. 7056 is an example, and are inclined at an angle $\phi$ to the primary envelope axis 18, where $\phi$ is the complement of the angle $\theta$ known as the Brewster angle. The Brewster angle $\theta$ is given by the relation $\theta = \tan^{-1} n$ where $n$ is the refractive index associated with the lens material used for the output windows 19.

Straddling the hollow envelope 17 are the optical reflectors 21, 22 having opposing confocal concave surfaces aligned with the central axis 18. The reflective elements 21, 22 are made, for example by suitable coating, to be highly selectively reflective of energy of a desired wave length. The reflector 22, however, is constructed by well known methods so as to transmit some of the energy at the desired wave length. The degree of transmission can be, for example, 1 to 5 percent. It is understood that the reflectors 21 and 22 may form part of the envelope structure 17, ar may be mounted within the envelope.

An electrical supply lead 23 connects the negative terminal of D.C. voltage source 24 to the cathode electrode section 14 and an electrical supply lead 25 connects the positive terminal of D.C. voltage source 24 to the anode electrode section 13.

Contained at reduced pressure within the elongated hollow envelope 17 is a suitable active gaseous medium which is susceptible to a population inversion. Advantageously, the energy level system of the gaseous laser medium includes a pair of levels between which the population inversion may be at least intermittently established and wherein the return of this system to normal equilibrium upon proper stimulation is accompanied by the emission of electromagnetic wave energy in the optical frequency range. Such a medium is obtained, for example, with a mixture of helium and neon gases.

In the operation of the gas laser tube shown in FIG. 1 a voltage of, for example, 300 volts is applied by the D.C. voltage source 24 between the anode electrode section 13 and the cathode electrode section 14 producing a gas discharge within the hollow envelope 17. By suitably selecting the lengths of the cathode electrode section 14 and the elongated central ceramic section 12 the discharge can be operated in either the hollow cathode or positive column mode. In the former case, the discharge consists primarily of the negative glow region inside the hollow cathode electrode 14 and very little positive column is present. In the latter case, the positive column is the dominant region of the discharge. During the helium-neon gas discharge, the metastable states of helium become populated in substantial numbers. Energy is then transferred by collision between the helium metastables and the unexcited neon atoms and the 2s states of neon are selectively populated. These neon atoms can then be stimulated to radiate energy in a continuous stream which is reciprocated between the reflectors 21, 22 growing in intensity on each traversal of the active laser medium. A portion of the reciprocating energy leaves the system through the partially transparent reflector 22. The escaping energy is then used in any suitable application.

Thus the present invention provides a gas discharge laser tube which makes use of a highly efficient and flexible hollow cathode gas discharge. Furthermore, the utilization of the discharge inducing electrodes themselves as a part of the laser envelope 17 provides a tube which is extremely simple and rugged. The requirement for complicated and typically fragile electrode supports within the tube envelope is eliminated. In addition the high thermal conductivity exhibited by the metal and ceramic envelope wall provides improved heat exchange, permits lower tube operating temperatures, and greatly extends the life expectancy of the device.

While the above description relates to a particular and preferred tube embodiment it will be appreciated that other arrangements are also possible. For example, many other active gaseous laser media may be utilized. These include, for example only argon, helium, krypton, neon, oxygen, and xenon used individually or in various mixtures. The use of molecular gases such as water vapor is also possible.

It will also be appreciated that although the foregoing description and the following claims refer to lasers, this term is meant to include devices operating at energy wave lengths in the far-infrared as well as those in the near-infrared and visible spectrums. Furthermore, the construction of gas lasers for operation at different wavelengths may entail certain modifications of the above structure without departing from the inventive concept. For example only, the difficulty of extracting far-infrared radiation through a partially transparent reflector may require the use of a small power extraction aperture at the center of the reflector 22. Similarly other types of opposed reflectors may be desired. The reflector apparatus may, for example, comprise a Fabry-Perot interferometer with a parallel pair of plane reflective surfaces separated by a gap of convenient length rather than by the concave reflectors 21, 22 shown. The reflectors can also be positioned within the laser envelope 17 or form the end walls thereof by replacing the Brewster angle output windows 19.

Figure 2:
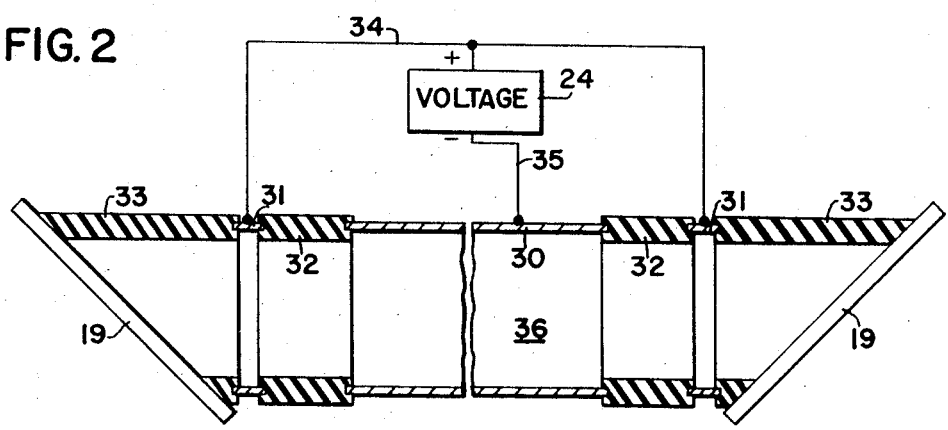
FIG. 2 is a similar cross-sectional view illustrating another preferred gas discharge laser tube embodiment of the invention.

FIG. 2 shows another gas discharge laser tube embodiment having the cylindrical elongated cathode electrode section 30 composed of an electrically conductive material, such as conducting metal. The pair of annular anode electrode sections 31 are connected to and insulated from the cathode electrode section 30 by the annular spacer sections 32 made of an electrical insulation material such as ceramic. The angular end sections 33, also made of an electrical insulation material such as ceramic, are connected to the ends of annular anode sections 31 and support the circular output windows 19 at the Brewster angle. As in the embodiment of FIG. 1 the envelope sections 30–33 are connected vacuum tightly in coaxial alignment by, for example, brazing to form an elongated hollow laser envelope 36. Electrical supply leads 34 connect the positive terminal of D.C. voltage source 24 to the anode electrode sections 31 and electrical supply lead 35 connects the negative terminal thereof to the cathode electrode section 30. Not shown but understood is suitable reflection apparatus such as the reflectors 21, 22 shown in FIG. 1.

The operation of the gas laser tube shown in FIG. 2 is the same as that described above in connection with FIG. 1. However the ionization inducing gas discharge comprises one discharge initiated by each of the annular anode sections 31 in conjunction with the cathode electrode section 30.

Figure 3:
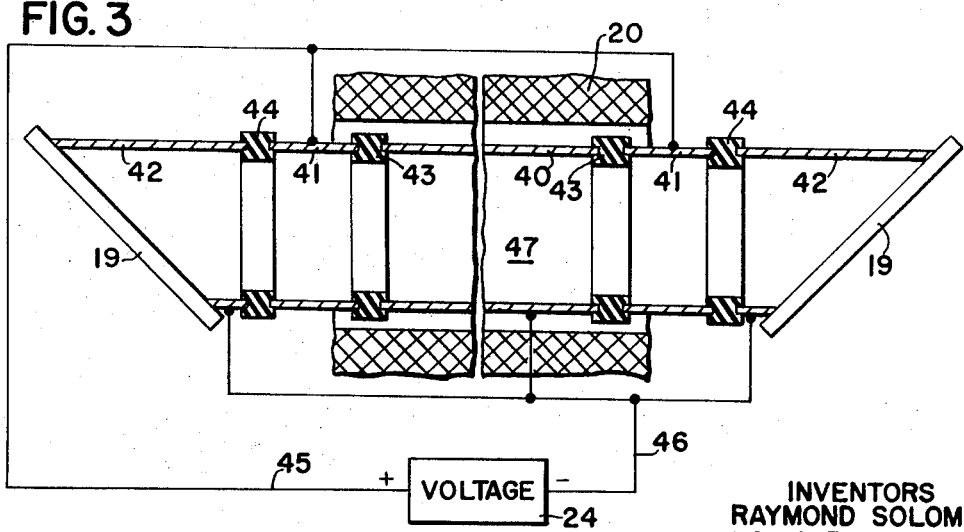
FIG. 3 is a similar cross-sectional view illustrating a third preferred gas discharge laser tube embodiment of the invention.

FIG. 3 shows another gas laser tube embodiment also having a cylindrical elongated cathode electrode section 40 straddled by a pair of annular anode electrode sections 41. The end sections 42 of this embodiment are also made of electrically conductive material so as to form auxiliary cathodes. Connecting the cathode section 40 and the electrode sections 41 are the annular spacer sections 43 formed of an electrical insulation material such as ceramic. Also made of ceramic are the annular auxiliary spacer sections 44 connecting the anode sections 41 and the auxiliary cathode sections 42. The electrical supply lead 45 connects the positive terminal of D.C. voltage source 24 to the annular anode sections 41 while the electrical supply leads 46 connect the negative terminal thereof to the cathode section 40 and to the auxiliary cathode sections 42. Again the envelope sections 40–44 are of circular cross section and are vacuum tightly connected in coaxial alignment by, for example, brazing to form the hollow elongated laser envelope 47.

The operation of the laser tube embodiment of FIG. 3 is also similar to that described in connection with FIG. 1. In this embodiment, however, a gas discharge will be initiated between each pair of adjacent anode and cathode electrode sections. It will be appreciated that this alternate connection of anode and cathode electrode sections can be continued to provide any desired number of electrode pairs. In this way any number of individual gas discharges can be initiated so as to produce ionization along the entire axial length of the laser envelope 47.

Since many changes could be made in the above construction and many apparently widely different embodiments of this invention could be made without departing from the scope thereof, it is intended that all matter contained in the above description or shown in the accompanying drawing shall be interpreted as illustrative and not in a limiting sense.

What is claimed is:

1. A gas discharge laser tube comprising a plurality of annular envelope sections connected vacuum tightly to form a hollow elongated envelope, said annular envelope sections including at least one electrical insulating envelope section connected between a pair of electrically conductive envelope sections, end walls vacuum tightly sealing the ends of said hollow elongated envelope, said hollow elongated envelope containing an active gaseous medium susceptible to a population inversion, opposed optical reflector means adapted to reciprocate energy through said active gaseous medium, and supply means for applying a voltage to said electrically conductive envelope sections.

2. A gas discharge laser tube as in claim 1, wherein said insulating section comprises a ceramic material, and said conductive sections are metal.

3. A gas discharge laser tube according to claim 1 wherein said end walls are made of an optically transparent material and have flat surfaces which make an angle of 90°—$\theta$ with the central axis of said hollow elongated envelope where $\theta$ represents the angle having a tangent equal to the refractive index of said optically transparent material.

4. A gas discharge laser tube according to claim 3 wherein said opposed optical reflector means comprise concave mirror surfaces straddling said hollow elongated envelope in alignment with the central axis thereof.

5. A gas discharge laser tube according to claim 1 including an annular solenoid surrounding said hollow elongated envelope.

6. A gas discharge laser tube comprising a cylindrical elongated central section composed of an electrical insulation material, annular anode and cathode electrode sections composed of an electrically conductive material, said anode and cathode electrode sections straddling said elongated central section and vacuum tightly connected thereto to form a hollow elongated envelope, end walls vacuum tightly sealing said hollow elongated envelope, said hollow elongated envelope containing an active gaseous medium susceptible to a population inversion, opposed optical reflector means adapted to reciprocate energy through said active gaseous medium, and supply means for applying a voltage to said anode and electrode sections.

7. A gas discharge laser tube according to claim 6, wherein said insulation material is ceramic, and said conductive material is metal, said materials being bonded.

8. A gas discharge laser tube according to claim 6 wherein said end walls are made of an optically transparent material and have flat surfaces which make an angle of 90°—$\theta$ with the central axis of said hollow elongated envelope where $\theta$ represents the angle having a tangent equal to the refractive index of said optically transparent material.

9. A gas discharge laser tube according to claim 8 including an annular solenoid surrounding said hollow elongated envelope.

10. A gas discharge laser tube comprising a cylindrical elongated cathode electrode section composed of an electrically conductive material, a pair of annular anode electrode sections composed of an electrically conductive material and straddling said cathode electrode section, a pair of annular spacer sections composed of an electrical insulation material and vacuum tightly connecting said pair of anode electrode sections with said cathode electrode section so as to form a hollow elongated envelope, end walls vacuum tightly sealing said hollow elongated envelope, said hollow elongated envelope containing an active gaseous medium susceptible to a population inversion, opposed optical reflector means adapted to reciprocate energy through said active gaseous medium, and supply means for applying a voltage to said anode and electrode sections.

References Cited

Smith: Optical Maser Action in the Negative Glow Region of a Cold Cathode Glow Discharge, J. Appl. Phys., vol. 33, No. 3 (March 1964), pp. 723 and 724.

Jahoda et al.: Plasma Experiments With a 570-KJ Theta-Pinch, J. Appl. Phys., vol. 35, No. 8 (August 1964), pp. 2351–2363.

JEWELL H. PEDERSEN, Primary Examiner

W. L. SIKES, Assistant Examiner

U.S. Cl. X.R.

313—220